(12) United States Patent
Cagno et al.

(10) Patent No.: US 8,130,084 B2
(45) Date of Patent: Mar. 6, 2012

(54) FAULT TOLERANT CLOSED SYSTEM CONTROL USING POWER LINE COMMUNICATION

(75) Inventors: Brian James Cagno, Tucson, AZ (US); Kenny Nian Gan Qiu, Tucson, AZ (US); Donald Scott Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 11/742,026

(22) Filed: Apr. 30, 2007

(65) Prior Publication Data

US 2008/0266077 A1    Oct. 30, 2008

(51) Int. Cl.
*G05B 11/01*    (2006.01)

(52) U.S. Cl. ............... 340/12.32; 340/12.33; 340/12.34; 340/12.35; 340/12.36; 340/12.37; 340/12.38; 340/12.39; 340/538.11; 340/568.2; 379/413.03; 307/1; 307/2; 307/3

(58) Field of Classification Search ............. 340/310.11, 340/538.11, 538, 12.32–12.39; 379/413.03; 307/1–3
See application file for complete search history.

(56) References Cited

U.S. PATENT DOCUMENTS

| | | | |
|---|---|---|---|
| 4,057,793 A | | 11/1977 | Johnson et al. |
| 4,218,655 A | | 8/1980 | Johnston et al. |
| 4,715,045 A | * | 12/1987 | Lewis et al. .................. 375/285 |
| 5,198,796 A | | 3/1993 | Hessling, Jr. |
| 5,198,810 A | * | 3/1993 | Harel ..................... 340/870.13 |
| 5,205,318 A | | 4/1993 | Massaro et al. |
| 5,455,932 A | * | 10/1995 | Major et al. .................. 711/162 |
| 5,777,874 A | * | 7/1998 | Flood et al. ..................... 700/82 |
| 5,812,748 A | * | 9/1998 | Ohran et al. ................... 714/4.5 |
| 5,815,652 A | * | 9/1998 | Ote et al. ......................... 714/31 |
| 5,828,569 A | * | 10/1998 | Fisher ............................. 700/82 |
| 5,835,780 A | * | 11/1998 | Osaki et al. ................... 713/300 |
| 5,835,953 A | * | 11/1998 | Ohran ........................... 711/162 |
| 5,838,921 A | * | 11/1998 | Speeter ......................... 709/227 |
| 5,903,594 A | * | 5/1999 | Saulnier et al. ............... 375/130 |
| 5,941,999 A | * | 8/1999 | Matena et al. ................. 714/6.1 |
| 6,023,772 A | * | 2/2000 | Fleming ......................... 714/13 |
| 6,119,215 A | * | 9/2000 | Key et al. ....................... 712/19 |
| 6,154,488 A | * | 11/2000 | Hunt ............................. 375/219 |

(Continued)

OTHER PUBLICATIONS

U.S. Appl. No. 11/857,778.

(Continued)

*Primary Examiner* — Benjamin C Lee
*Assistant Examiner* — Quang D Pham
(74) *Attorney, Agent, or Firm* — Frances Lammes; Stephen J. Walder, Jr.; Randall J. Bluestone (57) ABSTRACT

A method, system, and computer program product are provided for communicating to a powered element in a rack system. A controller injects communication data onto power lines that provides power to a plurality of powered elements. The powered elements determine if the communication data transmitted via the power lines should be used for configuration using an address embedded within the communication data. The powered elements compare an embedded target address within the communication data to the address of the particular element. If there is a match between the addresses, the corresponding powered element processes the communication data to configure the powered element. As a result, data may be communicated over the power lines thereby eliminating the need for separate communication lines. Thus, the amount of cables required to interconnect the powered elements of the distributed data processing system may be reduced by eliminating the communication lines from the system configuration.

18 Claims, 9 Drawing Sheets

U.S. PATENT DOCUMENTS

| | | | |
|---|---|---|---|
| 6,175,490 B1* | 1/2001 | Papa et al. | 361/679.48 |
| 6,188,973 B1* | 2/2001 | Martinez et al. | 702/188 |
| 6,407,987 B1* | 6/2002 | Abraham | 370/295 |
| 6,459,571 B1* | 10/2002 | Carteau | 361/679.33 |
| 6,522,737 B1* | 2/2003 | Bartolutti et al. | 379/156 |
| 6,535,110 B1* | 3/2003 | Arora et al. | 340/310.11 |
| 6,587,037 B1 | 7/2003 | Besser et al. | |
| 6,760,859 B1* | 7/2004 | Kim et al. | 714/4.21 |
| 6,956,463 B2* | 10/2005 | Crenella et al. | 307/3 |
| 6,980,091 B2* | 12/2005 | White et al. | 340/5.53 |
| 7,007,305 B2* | 2/2006 | Carson et al. | 726/36 |
| 7,102,490 B2* | 9/2006 | Flen et al. | 340/12.39 |
| 7,173,938 B1* | 2/2007 | Davidow | 370/401 |
| 7,236,765 B2* | 6/2007 | Bonicatto et al. | 455/402 |
| 7,286,026 B2* | 10/2007 | Law | 333/124 |
| 7,327,222 B2* | 2/2008 | Peltonen | 340/12.32 |
| 7,386,744 B2* | 6/2008 | Barr et al. | 713/320 |
| 7,406,231 B1 | 7/2008 | Beck et al. | |
| 7,432,824 B2* | 10/2008 | Flen et al. | 340/870.02 |
| 7,502,669 B1 | 3/2009 | Evans et al. | |
| 7,667,855 B2* | 2/2010 | Piazza | 356/614 |
| 7,694,029 B2 | 4/2010 | Kubo et al. | |
| 7,742,393 B2* | 6/2010 | Bonicatto et al. | 370/216 |
| 7,774,633 B1* | 8/2010 | Harrenstien et al. | 713/323 |
| 2002/0196128 A1* | 12/2002 | Gaus et al. | 340/310.01 |
| 2003/0076221 A1* | 4/2003 | Akiyama et al. | 340/310.01 |
| 2003/0107471 A1* | 6/2003 | Tsubone | 340/5.22 |
| 2003/0133473 A1* | 7/2003 | Manis et al. | 370/480 |
| 2003/0197619 A1* | 10/2003 | Lawrence et al. | 340/635 |
| 2004/0061486 A1 | 4/2004 | Peeke et al. | |
| 2004/0233929 A1* | 11/2004 | Hall et al. | 370/464 |
| 2005/0076255 A1* | 4/2005 | Bresniker et al. | 713/320 |
| 2005/0111560 A1* | 5/2005 | Haines | 375/257 |
| 2005/0137894 A1* | 6/2005 | Espinoza-Ibarra et al. | 705/1 |
| 2005/0185363 A1* | 8/2005 | Rasmussen et al. | 361/624 |
| 2005/0267639 A1* | 12/2005 | Sharma et al. | 700/276 |
| 2006/0038445 A1* | 2/2006 | Yanagida et al. | 307/1 |
| 2006/0044117 A1* | 3/2006 | Farkas et al. | 340/310.11 |
| 2007/0041545 A1* | 2/2007 | Gainsboro | 379/188 |
| 2007/0101393 A1 | 5/2007 | Ito | |
| 2007/0135155 A1* | 6/2007 | Lehr et al. | 455/522 |
| 2007/0154011 A1* | 7/2007 | Yoshihara et al. | 379/413.03 |
| 2007/0160172 A1* | 7/2007 | Koga et al. | 375/354 |
| 2007/0273205 A1* | 11/2007 | Aoyama | 307/3 |
| 2008/0133047 A1 | 6/2008 | Best et al. | |
| 2008/0157995 A1* | 7/2008 | Crist | 340/825.2 |
| 2008/0266077 A1* | 10/2008 | Cagno et al. | 340/538.11 |
| 2009/0002136 A1* | 1/2009 | Taguchi | 340/310.11 |
| 2009/0121845 A1* | 5/2009 | Juillot et al. | 340/310.11 |
| 2009/0184574 A1* | 7/2009 | Zavidniak et al. | 307/9.1 |
| 2009/0204729 A1 | 8/2009 | Best et al. | |

OTHER PUBLICATIONS

U.S. Appl. No. 11/862,593.

"Automated Method for Physically Mapping HW Locations in a Data Center", IBM Corporation, Technical Disclosure, http://www.ip.com/pubview/IPCOM000, Nov. 14, 2006, 4 pages.

U.S. Appl. No. 11/862,593, filed Sep. 27, 2007, Cagno et al.

U.S. Appl. No. 11/857,778, filed Sep. 19, 2007, Cagno et al.

Notice of Allowance mailed on Sep. 1, 2010 for U.S. Appl. No. 11/862,593; 5 pages.

* cited by examiner

FAULT TOLERANT CLOSED SYSTEM CONTROL USING POWER LINE COMMUNICATION

BACKGROUND

1. Technical Field

The present application relates generally to data processing system communications. More specifically, the present application is directed to data processing system communications using a fault tolerant closed system control.

2. Description of Related Art

Large scale rack mounted data processing systems, such as enterprise class data processing systems, require numerous cables to interconnect the various elements of the system together. For instance, a relatively small system may contain over a hundred cables while higher-end systems may contain thousands of cables. Not only is the routing of cables difficult, it is also very expensive, provides many failures points, and requires stocking of numerous field replaceable units. As systems grow so does the cabling, especially in redundant systems where there is often a need for two cables for each of power and communications per element to handle the high failure rates inherent to a mechanical design.

An example of the complexity in interconnecting a data processing system may be a system of eight elements that requires both primary and redundant communications and power cabling. For each element, there is a primary power cable, a redundant power cable, a primary communication cable, and a redundant communication cable. Thus, the system of eight elements requires 32 cables. Additionally, using primary and redundant communications requires a separate Ethernet switch for the primary communication system and the redundant communication system. As stated previously, such cabling increases cost, causes housings to be larger to accommodate extra cabling, provides failure points in the system, etc. These problems are increased with larger systems requiring even more cabling. Therefore, a need exists to reduce the cumbersome interconnection of data processing systems.

SUMMARY

The illustrative embodiments provide an alternating current (AC) power distribution and communication (ACPDC) controller that injects communication data onto a network that provides power to a number of powered elements. The powered elements determine if the communication data should be used for configuration using an address embedded within the communication data. Using communication data that is received over power lines feeding the powered elements reduces the amount of cables required to interconnect the powered elements of a distributed data processing system by eliminating the need for separate communication cable for communication data.

The illustrative embodiments provide for communicating to a powered element in a rack system. The illustrative embodiments receive a primary alternating current power signal with communication data in the powered element. The illustrative embodiments determine if the communication data is intended for the powered element. Responsive to the configuration data being for the powered element, the illustrative embodiments execute a set of instructions included in the communication data in the powered element. The powered element in the illustrative embodiments may also extract the communication data from the primary alternating current power source. The set of instructions may include instructions to power cycle the powered element. The powered element may be a field replaceable unit that is at least one of a computer, router, switch, modular storage element, controller, printer, or serial attached SCSI hard disk drive (SAS HDD).

In determining if the communication data is intended for the powered element, the illustrative embodiments analyze the communication data for an address, determine if the address corresponds to an address of the powered element, and use the communication data to execute the set of instructions included in the communication data in response to the address corresponding to the address of the powered element. The illustrative embodiments ignore the communication data in response to the address failing to correspond to the address of the powered element.

Additionally, the illustrative embodiments send, by the powered element, a reply message to a controller in response to the execution of the set of instructions. In sending the reply message to the controller, the illustrative embodiments injecting, by the powered element, the reply message for the controller onto the primary alternating current power source. A controller within the illustrative embodiments receives the primary alternating current power source with the reply message, extracts the reply message from the primary alternating current power source, determines if the reply message is from the powered element; and sends the reply message to the programming device in response to the reply message originating from the powered element.

The illustrative embodiments provide that the controller receives the communication data from a programming device via a primary communications connection intended for the powered element in a plurality of powered elements, and injects the communication data for the powered element onto the primary alternating current power source, where the primary alternating current power source supplies power to the plurality of powered elements.

The controller in the illustrative embodiments may determine if the primary alternating current power source has failed or if the primary communications connection has failed. The controller switches to a redundant alternating current power source and a redundant communications connection in response to the primary alternating current power source failing or the primary communication connection failing. The controller then performs all functions using the redundant alternating current power source and the redundant communications connection.

In the illustrative embodiments the powered element is one of a plurality of powered elements residing within a set of equipment racks in a rack system.

These and other features and advantages of the present invention will be described in, or will become apparent to those of ordinary skill in the art in view of, the following detailed description of the exemplary embodiments of the present invention.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide mechanisms for fault tolerant closed system control using power line communications. With the illustrative embodiments, a data processing device injects communication data onto the power connections that provide power to powered elements and the powered elements determine if the communication data should be used for configuration using an address embedded within the communication data.

Figure 1:
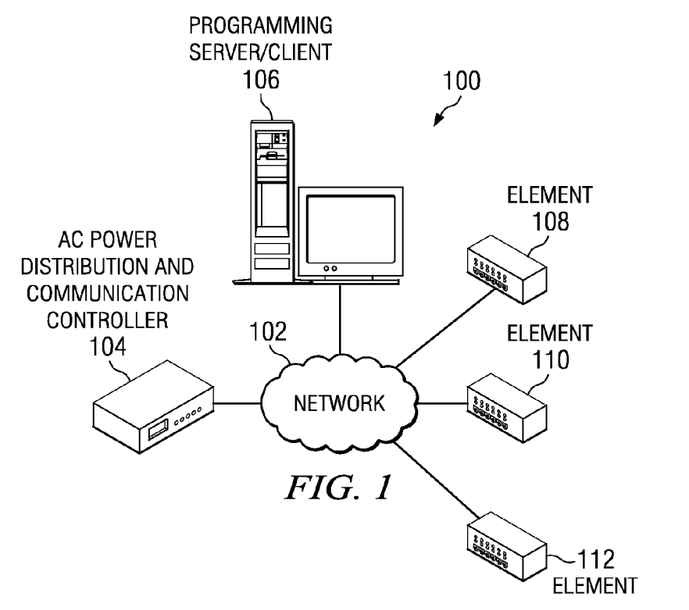
FIG. 1 is an exemplary representation of an exemplary distributed data processing system in which aspects of the illustrative embodiments may be implemented.
Figure 2:
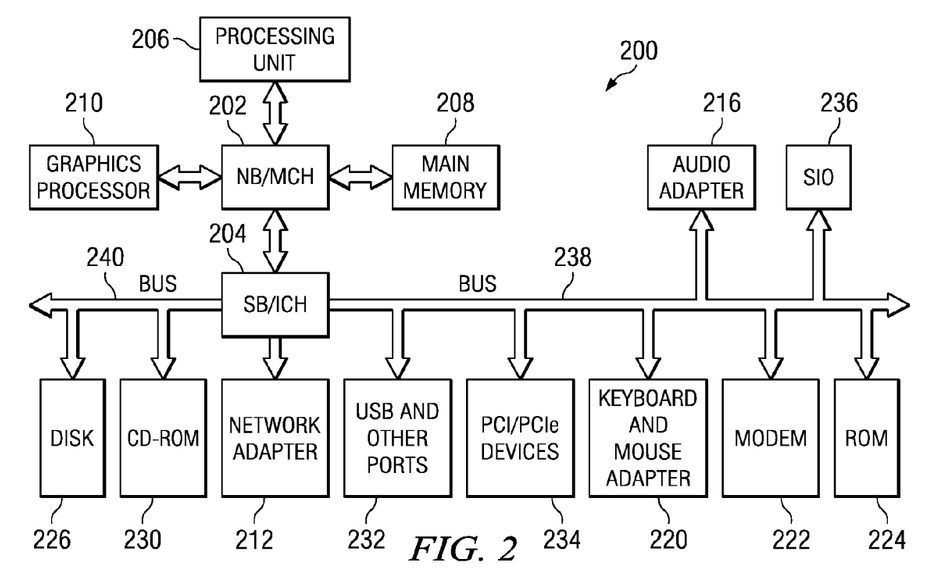
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is a representation of an exemplary distributed data processing system in which aspects of the illustrative embodiments may be implemented. Distributed data processing system 100 may include a network of data processing systems in which aspects of the illustrative embodiments may be implemented. Distributed data processing system 100 may also be referred to as a network node, which is a grouping of one or more network elements, at one or more sites, which provides network related functions, and is administered as a single entity. A single site may contain more than one network node. Distributed data processing system 100 contains at least one network 102, which is the medium used to provide communication links between various devices and computers connected together within distributed data processing system 100. Network 102 may include connections, for example, wired links, wireless communication links, fiber optic cables, or the like.

In the depicted example, alternating current (AC) power distribution and communication (ACPDC) controller 104 and programming server/client 106 are connected to network 102. ACPDC controller 104 and programming server/client 106 may be separate devices or one device performing both functions.

Powered elements 108, 110, and 112 may also be connected to network 102. Powered elements 108, 110, and 112 may be mounted within equipment racks within distributed data processing system 100. One or more equipment racks housing powered elements, such as powered elements 108, 110, and 112, may be referred to as a rack system. Each of powered elements 108, 110, and 112 may be a field replaceable unit (FRU). A FRU may be, for examples, a circuit board, part, or assembly that may be quickly and easily removed from a personal computer or other piece of electronic equipment and replaced by the user or by a technician without having to send the entire product or system to a repair facility. Examples of powered elements 108, 110, and 112 may be computers, routers, switches, modular storage elements, controllers, printers, serial attached SCSI hard disk drive (SAS HDD), or the like. Each of powered elements 108, 110, and 112 may have a unique network address, sometimes called a data link control (DLC) address, media access control (MAC) address, or the like.

The unique network address may be part of vital product data (VPD) of powered elements 108, 110, and 112. VPD is information provided in association with powered elements 108, 110, and 112, such as in a storage device of powered elements 108, 110, and 112, and which may be loaded into ACPDC controller 104 when powered elements 108, 110, and 112 are initiated in the system, for example. VPD information may also be provided separately from powered elements 108, 110, and 112, and may be loaded into ACPDC controller 104. The unique network address allows powered elements 108, 110, and 112 to be administered at a system or network level by ACPDC controller 104. Vital product data may include element model number, a unique serial number, product release level, maintenance level, address, or other information specific to the device type. Vital product data may also include user-defined information, such as the building, room, row, rack, shelf, or the like for the element. The collection and use of vital product data allows the status of a network or computer system to be understood and service provided more quickly.

In the depicted example, programming server/client 106 provides communication data, such as boot files, updated configurations, operating system images, and applications to powered elements 108, 110, and 112 using ACPDC controller 104. Powered elements 108, 110, and 112 are clients to ACPDC controller 104 in the depicted example. Distributed data processing system 100 may include additional ACPDC controllers, programming servers, programming clients, and other devices not shown.

In the depicted example, distributed data processing system 100 is a network node with network 102 representing a power grid that supplies power to the powered elements that are connected to the power grid. Of course, distributed data processing system 100 may also be implemented to include a number of different types of networks, such as for example, an Internet, an intranet, a local area network (LAN), a wide area network (WAN), or the like. As stated above, FIG. 1 is intended as an example, not as an architectural limitation for different embodiments of the present invention, and therefore, the particular powered elements shown in FIG. 1 should not be considered limiting with regard to the environments in which the illustrative embodiments of the present invention may be implemented.

ACPDC controller 104 injects communication data onto network 102, which provides power to powered elements 108, 110, and 112. Powered elements 108, 110, and 112 determine if the communication data transmitted via the power lines of the power grid provided by network 102 should be used for configuration using an address embedded within the communication data. That is, each of powered elements 108, 110, and 112 receives the communication data via the power lines and extracts the communication data from the power line signal. Powered elements 108, 110, and 112 compare an embedded target address within the communication data to the address of the particular element. If there is a match between the addresses, the corresponding powered element 108, 110, or 112 processes the communication data to configure the powered element 108, 110, or 112. As a result, data may be communicated over the power lines thereby eliminating the need for separate communication lines. Thus, the amount of cables required to interconnect powered elements 108, 110, and 112 of distributed data processing system 100 may be reduced by eliminating the communication lines from the system configuration.

With reference now to FIG. 2, a block diagram of an exemplary data processing system is shown in which aspects of the illustrative embodiments may be implemented. Data processing system 200 is an example of a computer, such as programming server/client 106, ACPDC controller 104, or powered element 108, 110, or 112 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX™ operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Data processing system 200 operating as a programming server/client, such as programming server/client 106 of FIG. 1, provides communication data, such as boot files, updated configurations, operating system images, and applications. Data processing system 200 operating as an ACPDC controller, such as ACPDC controller 104 of FIG. 1, injects communication data onto a network, such as network 102 of FIG. 1, through network adapter 212 of FIG. 2. The network provides power and communication data to powered elements, such as powered elements 108, 110, and 112 in FIG. 1, which in turn determine if the communication data should be used for configuring the particular powered elements using an address embedded within the communication data.

That is, each of the powered elements in the network receives the communication data via the power lines and extracts the communication data from the power line signal. The powered elements compare an embedded target address within the communication data to the address of the particular element. If there is a match between the addresses, the corresponding powered element processes the communication data to configure the powered element. As a result, data may be communicated over the power lines in the network thereby eliminating the need for separate communication lines. As a result, the amount of cables required to interconnect powered elements of a distributed data processing system is reduced by eliminating the need for separate communication lines.

Prior element rack cabling configurations are comparatively more complex because the number of cables that are required to interconnect the primary and redundant communications and power cabling. For each element, there is a primary power cable, a redundant power cable, a primary communication cable, and a redundant communication cable as is shown in FIG. 3.

Figure 3:
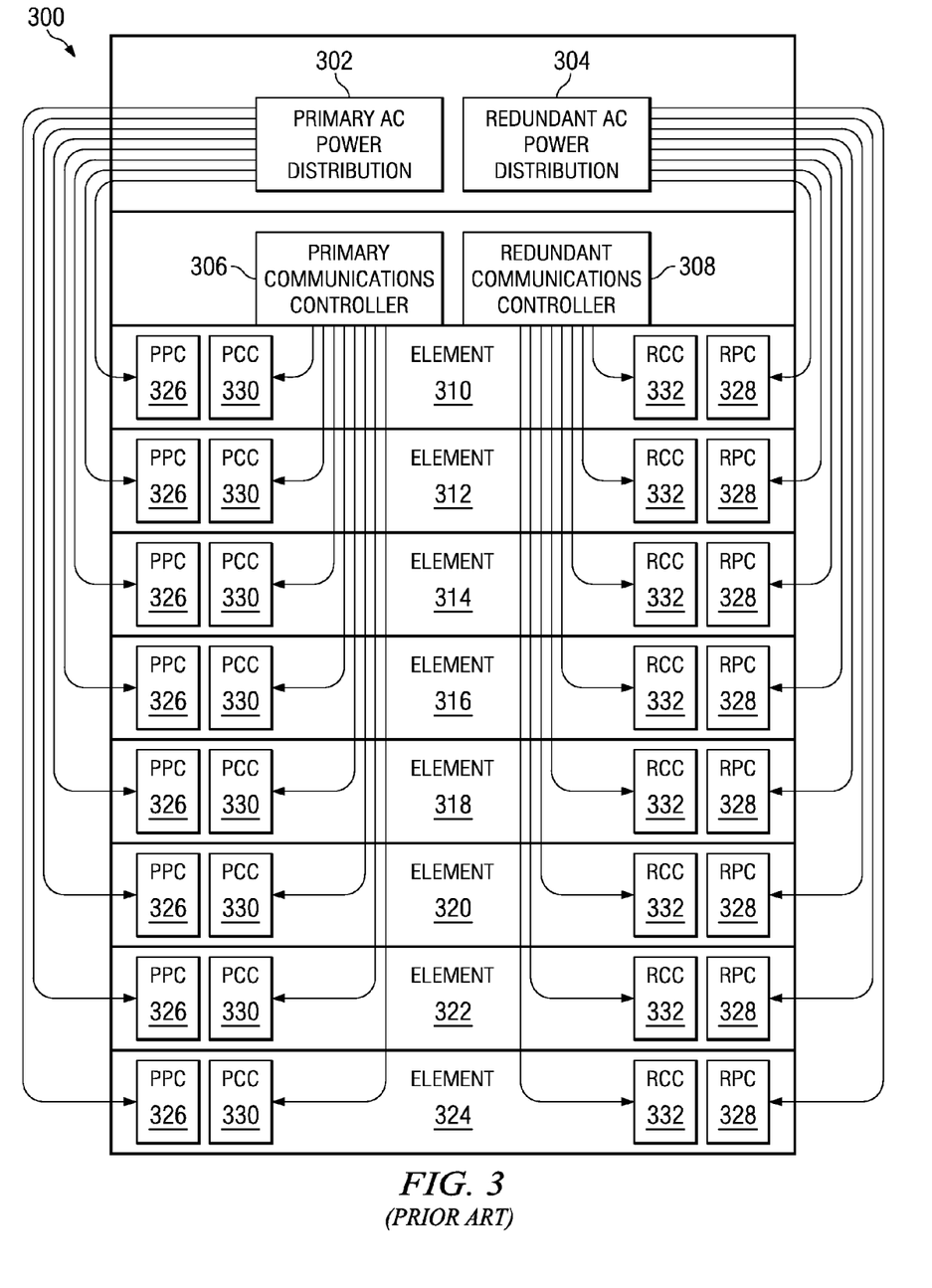
FIG. 3 is a prior art configuration of elements within a network node.

FIG. 3 is a prior art configuration of elements within a network node. Element configuration 300 includes primary alternating current (AC) power distribution 302, redundant AC power distribution 304, primary communications controller 306, redundant communications controller 308, and powered elements 310-324. Each of powered elements 310-324 includes primary power connection (PPC) 326, redundant power connection (RPC) 328, primary communication connection (PCC) 330, and redundant communication connection (RCC) 332. In order to properly configure each of powered elements 310-324, a separate cable must be provided for primary AC power, redundant AC power, primary communications, and redundant communications to each element. Thus, for the eight elements in element configuration 300, there has to be a total of thirty-two cables, eight for primary AC power, eight for redundant AC power, eight for primary communications, and eight for redundant communications.

Figure 4:
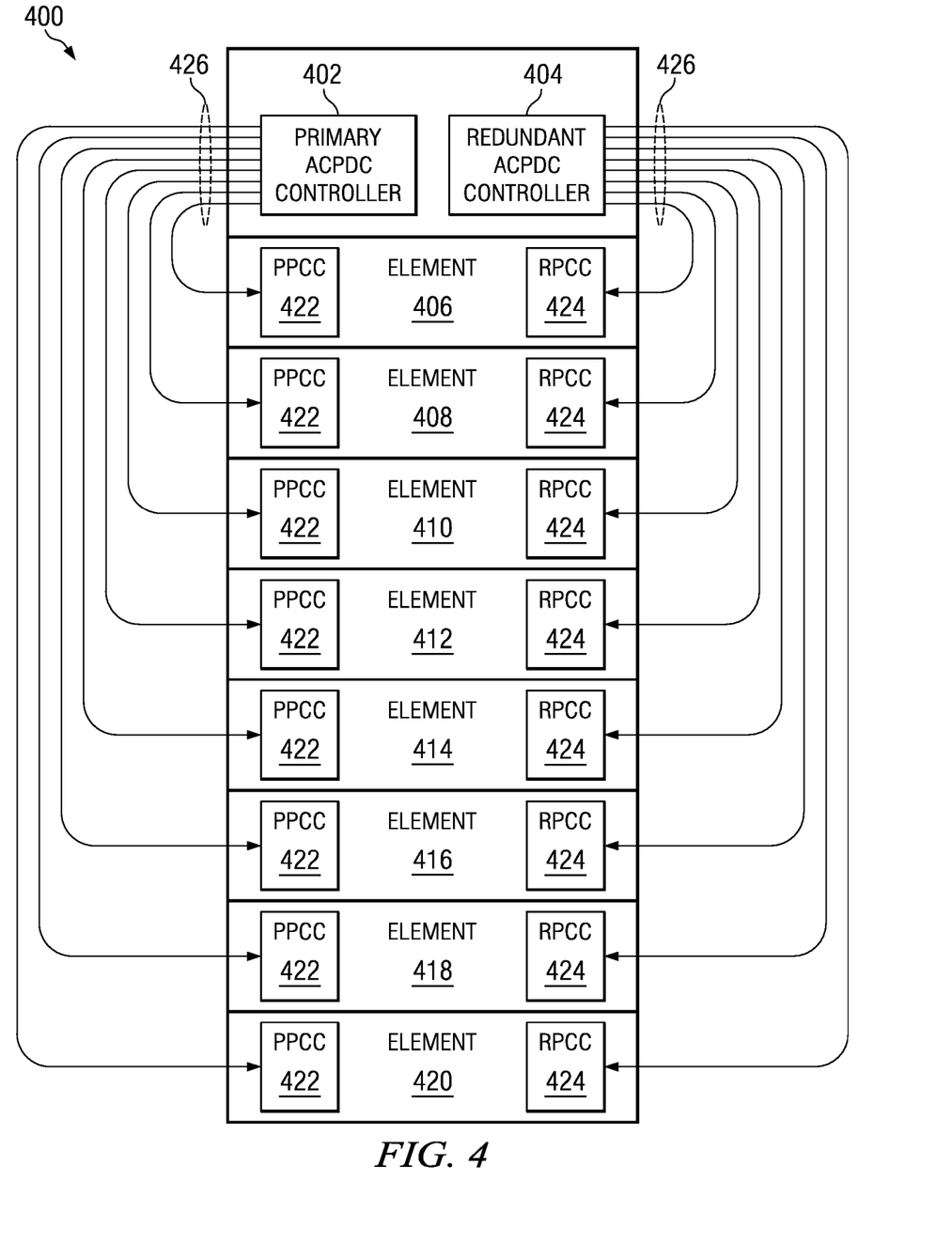
FIG. 4 depicts an improved configuration of powered elements within a network node in accordance with an exemplary embodiment.

FIG. 4 depicts an improved configuration of powered elements within a network node in accordance with an exemplary embodiment. Powered element configuration 400 uses primary alternating current (AC) power distribution and communication (ACPDC) controller 402 and redundant ACPDC controller 404, such as ACPDC controller 104 of FIG. 1, to provide power and data communications to powered elements 406-420, such as powered elements 108, 110, and 112 of FIG. 1. Each of powered elements 406-420 includes primary power and data communication connection (PPCC) 422 and redundant power and data communication connection (RPCC) 424. Powered elements 406-420 may be field replaceable units, such as a serial attached SCSI hard disk drive (SAS HDD). Through this configuration, the amount of cabling is reduced to half that of the prior art configuration shown in FIG. 3.

In powered element configuration 400, primary ACPDC controller 402 and redundant ACPDC controller 404 allow for completely redundant and isolated data communication paths by summing or injecting a high-frequency data communication carrier signal, provided from a data processing system, such as data processing system 200 of FIG. 2, onto the 60 hertz AC power signal. Thus, using a combined power and data communication connections 426 through the AC distribution allows for controlling powered elements 406-420 with commands, for example, on, off, status, configuration, power cycling, or the like. Power cycling is the act of turning an element off and then on again. This may be performed, for example, with the intent of recovering the element from a hung state. Thus, a single one of primary ACPDC controller 402 and a single one of redundant ACPDC controller 404 may be configured to control all powered elements connected to the same primary and redundant power sources using power and data communication connections 426. Powered elements 406-420 determine which communication data to use by identifying address information contained within the communication data as will be described in detail below.

Thus, primary ACPDC controller 402 and redundant ACPDC controller 404 inject communication data onto powered connections to powered elements 406-420, which will be described in detail in FIG. 5. Powered elements 406-420 determine if the communication data should be used for configuration using an address embedded within the communication data, which will be described in detail in FIG. 6. That is, each of powered elements 406-420 receives the communication data via power and data communication connections 426 and extracts the communication data from the power line signal.

Powered elements 406-420 compare an embedded target address within the communication data to the address of the particular element. If there is a match between the addresses, the corresponding one of powered elements 406-420 processes the communication data to configure the powered element 406-420. As a result, data may be communicated over power and data communication connections 426 thereby eliminating the need for separate communication lines. Thus, the amount of cables required to interconnect powered elements 406-420 is reduced.

Figure 5:
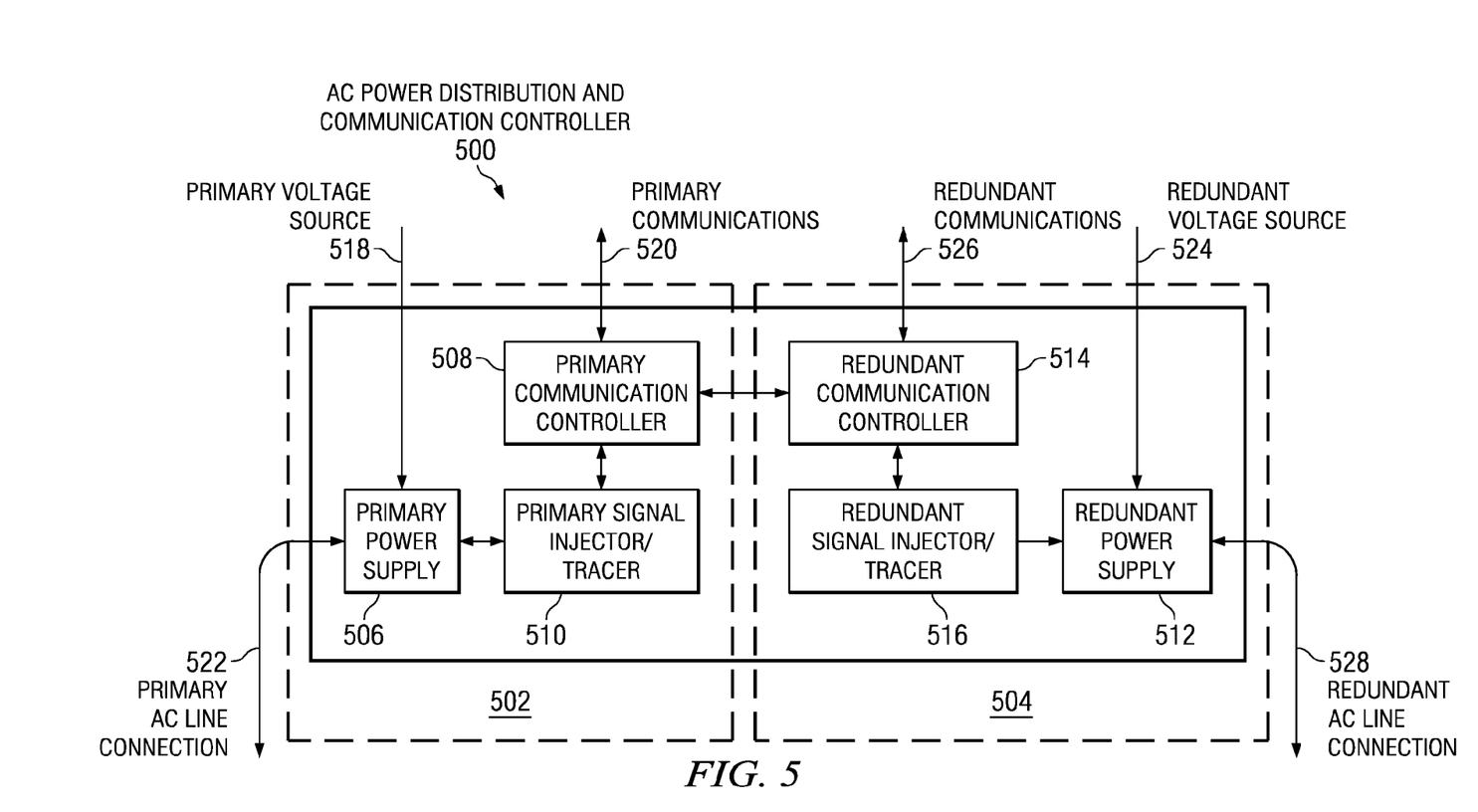
FIG. 5 depicts an exemplary ACPDC controller in accordance with an illustrative embodiment.

FIG. 5 depicts an exemplary ACPDC controller in accordance with an illustrative embodiment. ACPDC controller 500 includes primary ACPDC controller 502 and redundant ACPDC controller 504, similar to primary ACPDC controller 402 and redundant ACPDC controller 404 of FIG. 4. Primary ACPDC controller 502 includes primary power supply 506, primary communication controller 508, and primary signal injector/tracer 510. Redundant ACPDC controller 504 includes redundant power supply 512, redundant communication controller 514, and redundant signal injector/tracer 516. Primary power supply 506 receives AC power from primary voltage source 518.

Primary communication controller 508, which is a data processing system, such as data processing system 200 of FIG. 2, receives and transmits primary communications 520 from and to a programming server/client, such as programming server/client 106 of FIG. 1. Primary communications 520 are high-frequency communication carrier signals. Primary signal injector/tracer 510 injects the high-frequency communication carrier signal received from primary communication controller 508 onto the 60 hertz AC power signal of primary power supply 506. Primary signal injector/tracer 510 is also responsible for extracting the high-frequency communication carrier signals received from a powered element. The combined signal is sent to the powered elements in the network node over primary AC line connection 522.

Redundant power supply 512 receives AC power from redundant voltage source 524. Redundant communication controller 514, which is a data processing system, such as data processing system 200 of FIG. 2, receives and transmits redundant communications 526 from and to the programming server/client. Redundant communications 526 are also high-frequency communication carrier signals. Redundant signal injector/tracer 516 injects the high-frequency communication carrier signal received from redundant communication controller 514 onto the 60 hertz AC power signal of redundant power supply 512. Redundant signal injector/tracer 516 is also responsible for extracting the high-frequency communication carrier signals received from a powered element. The combine signals are sent to the powered elements in the network node over redundant AC line connection 528.

Thus, primary signal injector/tracer 510 injects communication data onto primary voltage source 518 to powered elements through primary AC line connection 522. Likewise, if primary voltage source 518 fails to deliver power, primary power supply 506 ceases to function, or communications through primary communication controller 508 is lost, redundant signal injector/tracer 516 injects communication data onto redundant voltage source 524 to powered elements through redundant AC line connection 528. That is, each of the powered elements receives the communication data via primary AC power line connection 522 or redundant AC line connection 528 the power lines and extracts the communication data from the power line signal.

The powered elements compare an embedded target address within the communication data to the address of the particular element. If there is a match between the addresses, the corresponding powered element processes the communication data to configure the powered element. As a result, data may be communicated over primary AC line connection 522 or redundant AC line connection 528 thereby eliminating the need for separate communication lines. Therefore, the amount of cables required to interconnect the powered elements is reduced.

Figure 6:
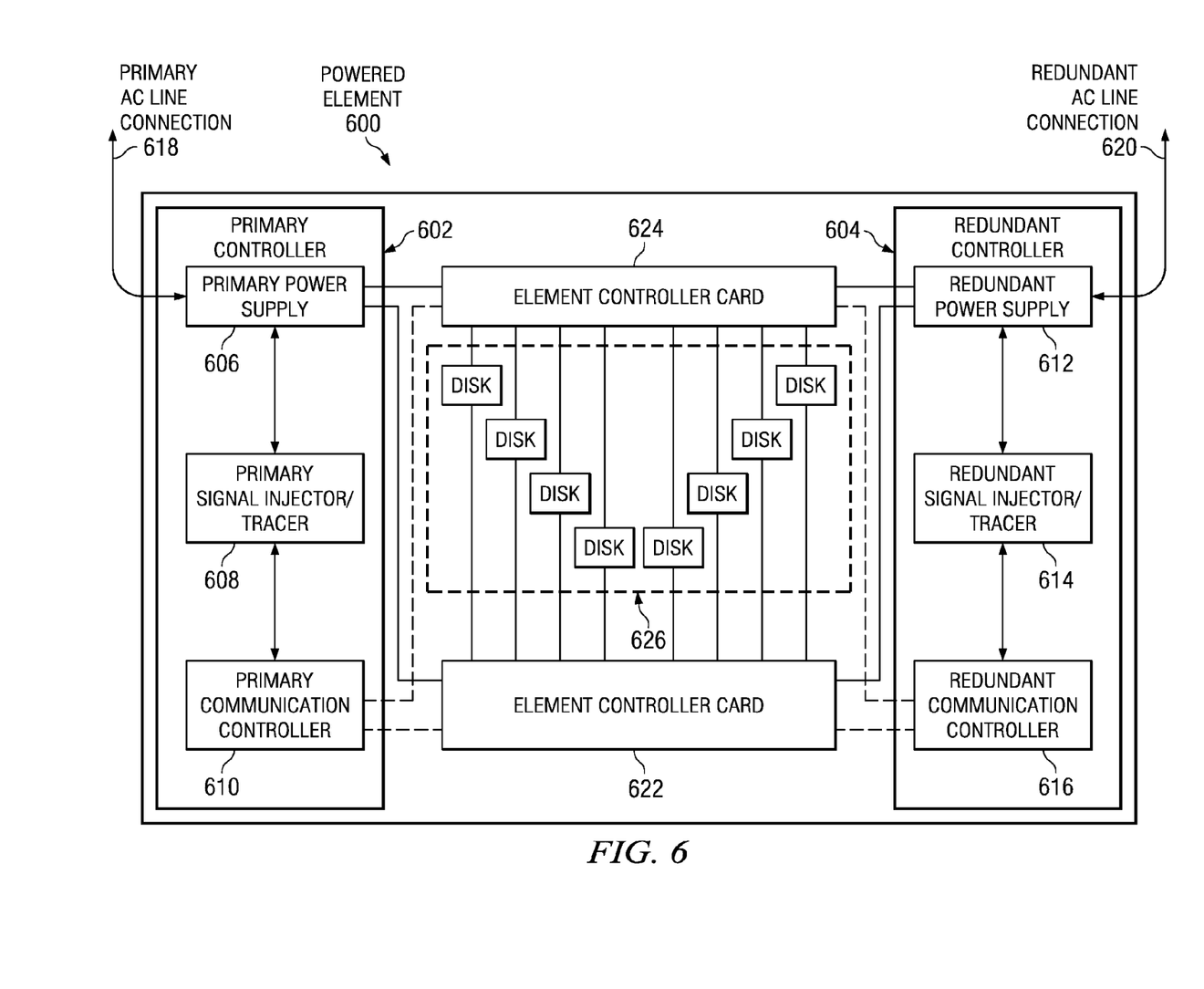
FIG. 6 depicts an exemplary powered element that receives power and communications from an ACPDC controller in accordance with an illustrative embodiment.

FIG. 6 depicts an exemplary powered element that receives power and communications from an ACPDC controller in accordance with an illustrative embodiment. Powered element 600, such as one of powered elements 406-420 of FIG. 4, includes primary controller 602 and redundant controller 604. Primary controller 602 includes primary power supply 606, primary signal injector/tracer 608, and primary communication controller 610. Powered element 600 may be a field replaceable unit, such as a serial attached SCSI hard disk drive (SAS HDD). Redundant controller 604 includes redundant power supply 612, redundant signal injector/tracer 614, and redundant communication controller 616.

Primary power supply 606 receives AC power from the primary power supply of an ACPDC controller, such as primary ACPDC controller 502 of FIG. 5, over primary AC line connection 618. Primary signal injector/tracer 608 extracts the high-frequency communication carrier signal received from the ACPDC controller and sends the signal to primary communication controller 610, which is a data processing system, such as data processing system 200 of FIG. 2. Primary signal injector/tracer 608 is also responsible for injecting any returning high-frequency communication carrier signals received from primary communication controller 610 onto the 60 hertz AC power signal of primary power supply 606. Primary communication controller 610 receives and transmits signals from and to primary signal injector/tracer 608. Communication signals received by primary communication controller 610 from primary signal injector/tracer 608 may be powered element commands, for example, on, off, status, configuration, power cycling, or the like.

Since the communications signal is sent to each powered element connected to the ACPDC controller, primary communication controller 610 determines if the received command is for the particular powered element by identifying the address information included in the communication signal. If the address in the address information is not the address of the particular powered element, then primary communication controller 610 simply ignores the communication signal. However, if the address in the address information is the address of powered element 600, then primary communication controller 610 initiates the command included in the communication signal for the device within powered element 600, such as element controller cards 622 or 624, disk drive control cards 626, or the like depending on which devices are within the powered element.

Redundant power supply 612 operates in a similar manner to primary controller 602. Redundant power supply 612 receives AC power from the redundant power supply of an ACPDC controller over redundant AC line connection 620. Redundant signal injector/tracer 614 extracts the high-frequency communication carrier signal and sends the signal to redundant communication controller 616. Redundant signal injector/tracer 614 also injects any returning high-frequency communication carrier signals onto the 60 hertz AC power signal of redundant power supply 612. Redundant communication controller 616 receives and transmits signals from and to redundant signal injector/tracer 614.

Again, since the communications signal is sent to each powered element connected to the ACPDC controller, redundant communication controller 616 determines if the received command is for the particular powered element and if the address in the address information is the address of the powered element 600, then redundant communication controller 616 initiates the command included in the communication signal for the device within powered element 600.

Redundant controller 604 continually monitors the functions performed by primary controller 602. Likewise, primary controller 602 continually monitors the functions performed by redundant controller 604. In the event the primary voltage source fails to deliver power, primary power supply 606 ceases to function, or communications through primary communication controller 610 is lost, for a predetermined amount of time, redundant controller 604 seizes control of powered element 600. Likewise, if the primary voltage source resumes delivering power, primary power supply 606 resumes function, or communications through primary communication controller 610 is returns primary controller 602 resumes control of powered element 600.

Thus, powered element 600 receives the communication data via the primary AC line connection 618 or, in the event of a primary failure, redundant AC line connection 620 and extracts the communication data from the power line signal. Powered element 600 compares an embedded target address within the communication data to the address of the particular element. If there is a match between the addresses, powered element 600 processes the communication data to configure itself. As a result, data may be communicated over the power lines thereby eliminating the need for separate communication lines. Thus, the amount of cables required to interconnect powered element 600 is reduced.

Figure 7A:
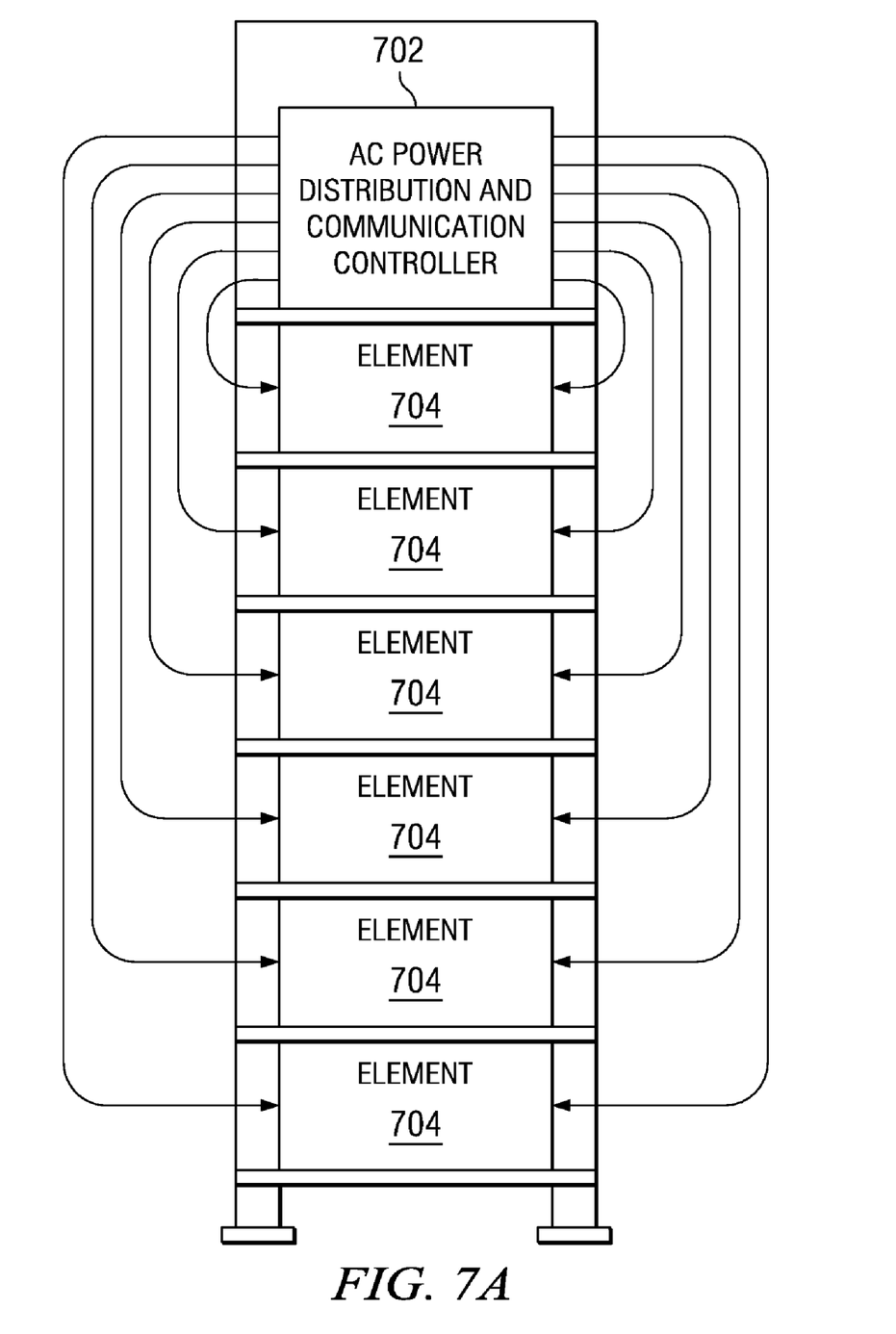
FIGS. 7A and 7B are exemplary ACPDC controller and powered element configurations in accordance with an illustrative embodiment.
Figure 7B:
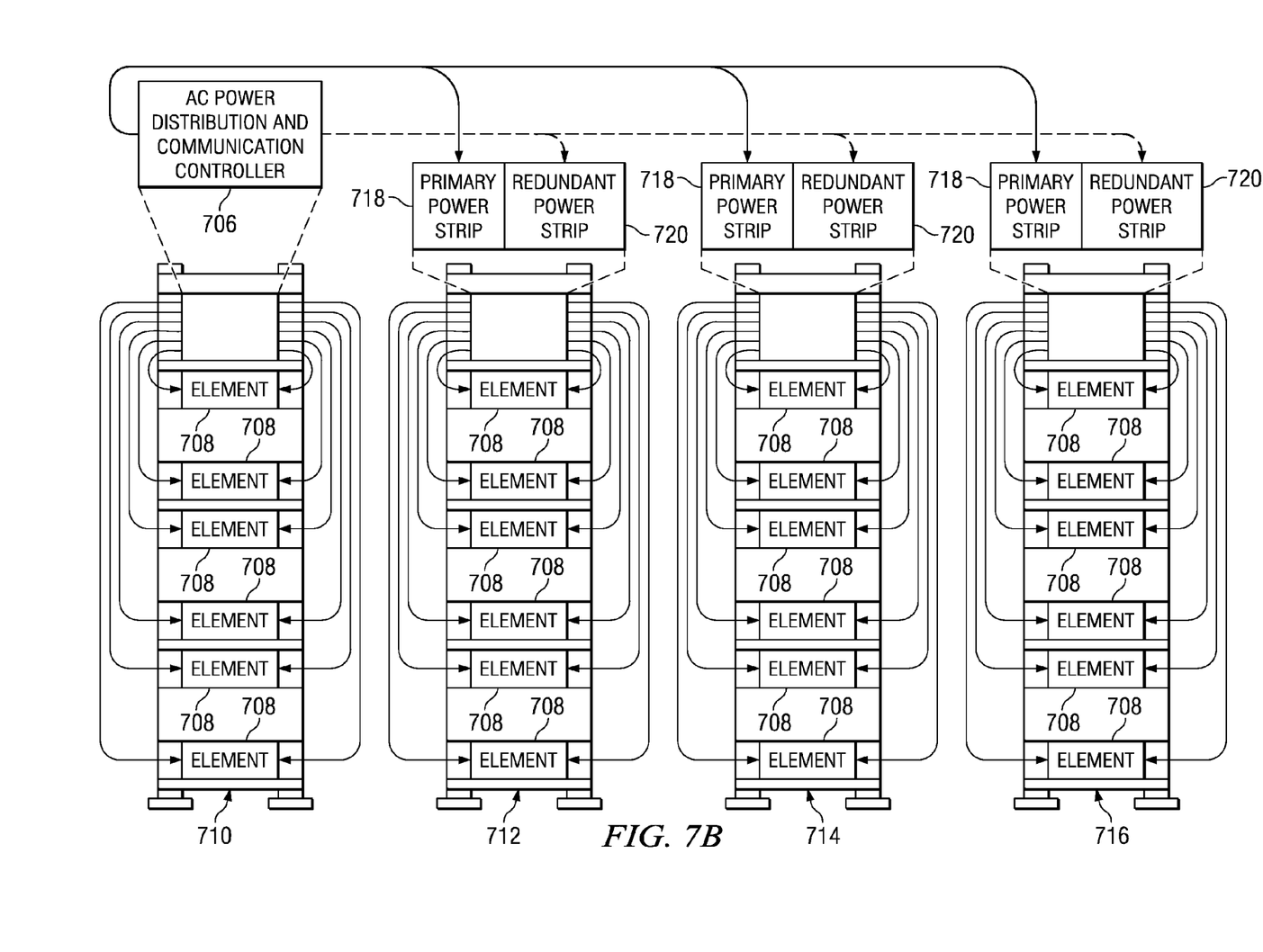

FIGS. 7A and 7B are exemplary ACPDC controller and powered element configurations in accordance with an illustrative embodiment. FIG. 7A depicts a single rack configuration where ACPDC controller 702 is controlling a plurality of powered elements 704 within the same rack. FIG. 7B depicts a multiple rack configuration where ACPDC controller 706 is controlling a plurality of powered elements 708 in racks 710-716 using primary power strips 718 that are connected to the primary power supply of ACPDC controller 706 and redundant power strips 720 that are connected to the redundant power supply of ACPDC controller 706.

As mentioned above, since the communications signal is sent to each of powered elements 704 or 708 connected to ACPDC controller 702 or 706, respectively, either directly or through a power strip, the primary and redundant communication controller in each of powered elements 704 or 708 determine if the received command is for the particular powered element by identifying the address information included in the communication signal. If the address in the address information is not the address of the particular powered element, then primary and redundant communication controller simply ignores the communication signal. However, if the address in the address information is the address of the particular powered element, then primary or redundant communication controller initiates the command included in the communication signal for the device within the powered element.

As can be seen in FIGS. 7A and 7B, an ACPDC controller injecting communication data onto the AC line connections that provide power to powered elements 704 and 708 reduces the amount of cables required to interconnect powered elements 704 and 708.

Figure 8:
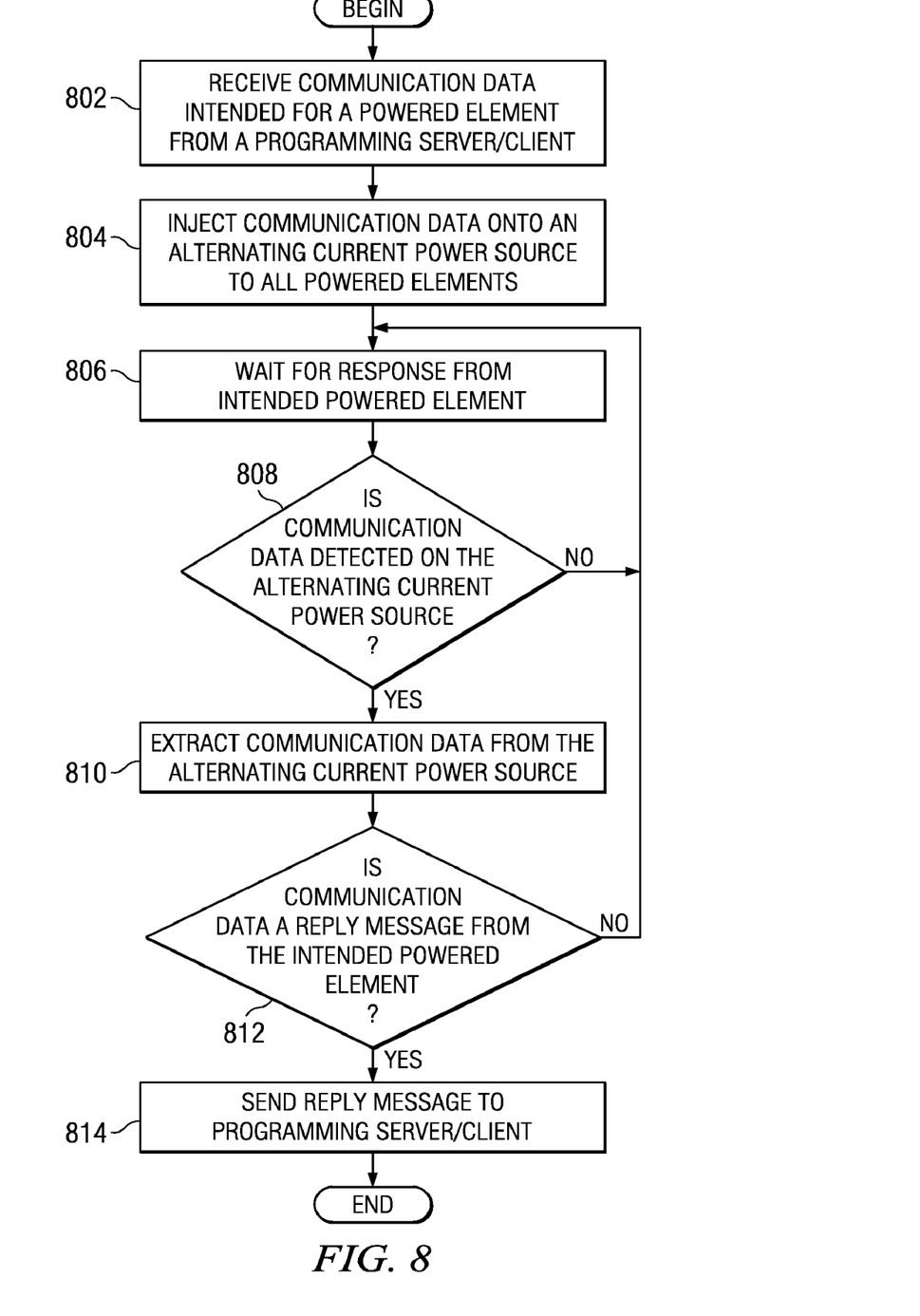
FIG. 8 is a flow diagram of the operation performed by an ACPDC controller in accordance with an illustrative embodiment.

FIG. 8 is a flow diagram of the operation performed by an ACPDC controller in accordance with an illustrative embodiment. The following operations are performed by an ACPDC controller, such as ACPDC controller 500 of FIG. 5. The operations performed by the ACPDC controller is performed the same for both primary and redundant voltage sources and communications. As the operation begins, the ACPDC controller receives communication data intended for a specific powered element from a programming server/client (step 802). The specified powered element is identified by an address that is unique for each element connected to the ACPDC controller. The communication data may include a set of instructions that are to be executed by the specified powered element. The set of instructions may be one instruction or any number of instructions. The ACPDC controller injects the communication data onto the AC power source that provides power to all connected powered elements (step 804).

The ACPDC controller then waits for a response from the powered element in response to the powered element executing the set of instructions that are included in the communication data (step 806). The ACPDC controller monitors the AC power source to determine if communication data is detected on the AC power source that is powering the powered elements (step 808). If at step 808 the ACPDC controller fails to detect communication data on the AC power source, the operation returns to step 806. If at step 808 the ACPDC controller detects communication data on the AC power source, the ACPDC controller extracts the communication data from the AC power source (step 810). The ACPDC determines if the communication data is a reply message from the specified element (step 812). If at step 812 the communication data is not a reply message from the specified element, the operation returns to step 806. If at step 812, the communication data is a reply message from the specified element, the communication data with the reply message is sent to the programming server/client (step 814) with the operation ending thereafter.

Thus, the ACPDC controller injects communication data onto the AC voltage source to the powered elements through the AC line connection and the amount of cables required to interconnect the powered elements is reduced.

Figure 9:
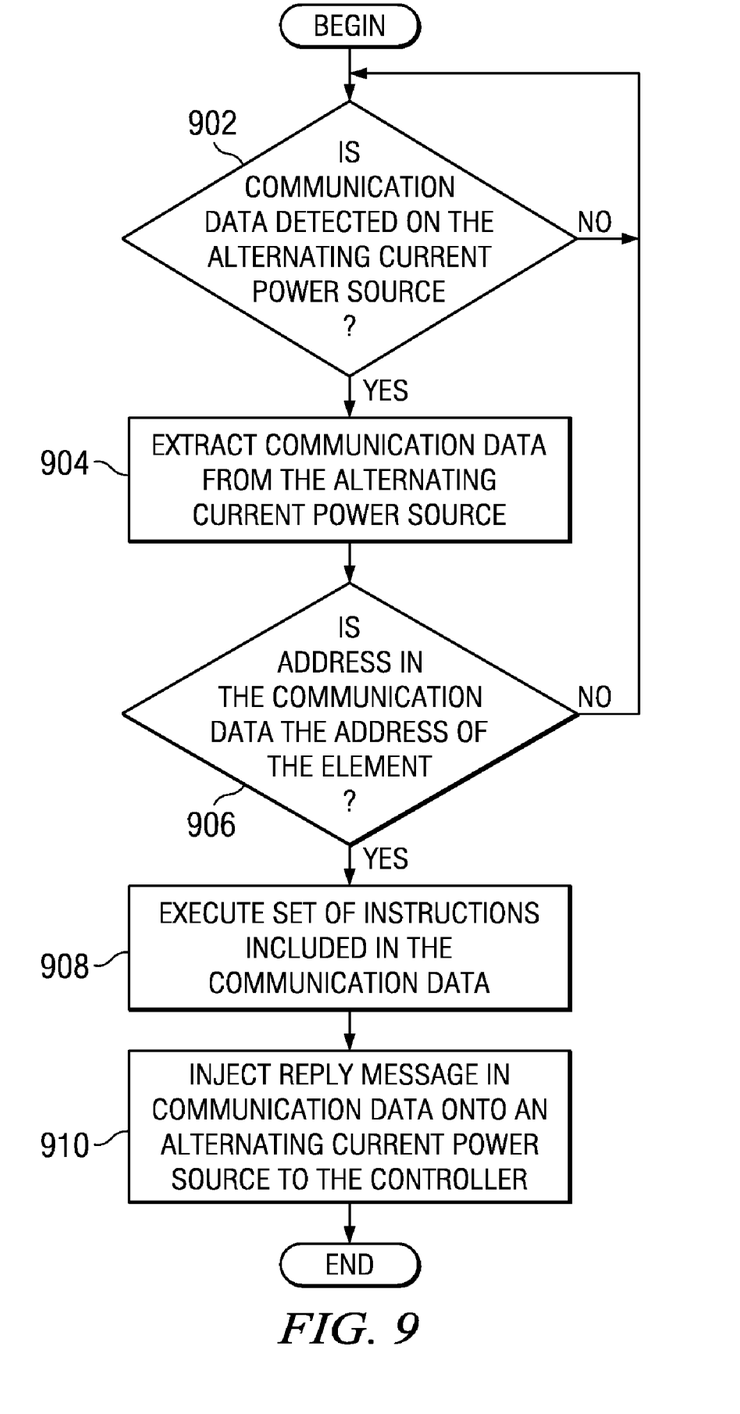
FIG. 9 is a flow diagram of the operation performed by a powered element in accordance with an illustrative embodiment.

FIG. 9 is a flow diagram of the operation performed by a powered element in accordance with an illustrative embodiment. The following operations are performed by a powered element, such as powered element 600 of FIG. 6. The operations performed by the powered element is performed the same for both primary and redundant voltage sources and communications. As the operation begins, the powered element monitors the incoming AC power source to determine if communication data is detected on the AC power source (step 902). If at step 902 no communication data is detected, then the operation returns to step 902. If at step 902 communication data is detected, the powered element extracts the communication data from the AC power source (step 904).

The powered element determines if the extracted communication data is communication data intended for the receiving powered element (step 906). The powered element determines if extracted communication data is intended for the receiving powered element by looking at the address included in the communication data and comparing the address to the address of the powered element. If at step 906 the communication data is not communication data for the powered element, the powered element ignores the communication data and the operation returns to step 902. If at step 906 the communication data is communication data for the powered element, the powered element executes the set of instructions included in the communication data (step 908). Once the powered element finishes executing the set of instructions, the powered element injects a reply message within communication data onto the AC power source back to the ACPDC controller (step 910) with the operation ending thereafter.

Thus, the powered element determines if the communication data should be used for configuration using an address embedded within the communication data and the amount of cables required to interconnect the powered element is reduced.

Therefore, the illustrative embodiments provide for a fault tolerant closed system control using power line communications. The illustrative embodiments provide for communicating to a powered element in a rack system. The illustrative embodiments receive a primary alternating current power signal with communication data in the powered element. The illustrative embodiments determine if the communication data is intended for the powered element. Responsive to the configuration data being for the powered element, the illustrative embodiments execute a set of instructions included in the communication data in the powered element. The powered element in the illustrative embodiments may also extract the communication data from the primary alternating current power source.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable medium having a computer readable program, wherein the computer readable program, when executed in a rack-mounted data processing system comprising an alternating current power distribution and communication (ACPDC) controller and a powered element, causes the rack-mounted data processing system to:
   receive, by the powered element, a primary alternating current power signal with primary communication data and a redundant alternating current power signal with redundant communication data from the ACPDC controller;
   determining, by a primary controller in the powered element, whether the primary communication data is intended for the powered element;
   determining, by a redundant controller in the powered element, whether the redundant communication data is intended for the powered element;
   responsive to the primary communication data being for the powered element and the primary controller working properly, executing, by the primary controller in the powered element, a set of instructions included in the primary communication data in the powered element;
   responsive to execution of the set of instructions, send, by the primary controller in the powered element, a reply message to the ACPDC controller, wherein the computer readable program to send the reply message to the ACPDC controller further includes the computer readable program that causes the rack-mounted data processing system to:
      inject, by the primary controller in the powered element, the reply message for the ACPDC controller onto the primary alternating current power signal;
      receive, by the ACPDC controller, the primary alternating current power signal with the reply message;
      extract, by the ACPDC controller, the reply message from the primary alternating current power signal;
      determine, by the ACPDC controller, whether the reply message is from the powered element; and
      responsive to the reply message originating from the powered element, send, by the ACPDC controller, the reply message to a programming device external to the rack-mounted data processing system;
   monitoring, by the redundant controller in the powered element, the functions performed by the primary controller in the powered element to determine whether the primary controller is working improperly; and
   responsive to the redundant communication data being for the powered element and the primary controller working improperly, executing, by the redundant controller in the powered element, a set of instructions included in the redundant communication data in the powered element.

2. The computer program product of claim 1, wherein the computer readable program to determine whether the primary communication data is intended for the powered element further includes the computer readable program that causes the rack-mounted data processing system to:
   analyze, by the primary controller in the powered element, the primary communication data for an address;
   determine, by the primary controller in the powered element, whether the address corresponds to an address of the powered element;
   responsive to the address corresponding to the address of the powered element, use, by the primary controller in the powered element, the primary communication data to execute the set of instructions included in the primary communication data;
   responsive to the address failing to correspond to the address of the powered element, ignore, by the primary controller in the powered element, the primary communication data.

3. The computer program product of claim 1, wherein the set of instructions include instructions to power cycle the powered element.

4. The computer program product of claim 1, wherein the powered element is a field replaceable unit and wherein the field replaceable unit is at least one of a computer, router, switch, modular storage element, controller, printer, or serial attached SCSI hard disk drive.

5. The computer program product of claim 1, wherein the computer readable program further causes the rack-mounted data processing system to:
   extract, by the primary controller in the powered element, the primary communication data from the primary alternating current power signal.

6. The computer program product of claim 1, wherein the computer readable program further causes the rack-mounted data processing system to:
   receive, by the ACPDC controller, communication data from the programming device external to the rack-mounted data processing system via a primary communications connection intended for the powered element in a plurality of powered elements;
   inject, by the ACPDC controller, the primary communication data for the powered element onto the primary alternating current power signal, wherein the primary alternating current power signal supplies primary power to the plurality of powered elements; and
   inject, by the ACPDC controller, the redundant communication data for the powered element onto the redundant alternating current power signal, wherein the redundant alternating current power signal supplies redundant power to the plurality of powered elements.

7. The computer program product of claim 1, wherein the powered element is one of a plurality of powered elements and wherein the plurality of powered elements reside within a set of equipment racks in the rack-mounted data processing system.

8. The computer program product of claim 1, wherein the computer readable program to determine whether the redundant communication data is intended for the powered element further includes the computer readable program that causes the rack-mounted data processing system to:
  analyze, by the redundant controller in the powered element, the redundant communication data for an address;
  determine, by the redundant controller in the powered element, whether the address corresponds to an address of the powered element;
  responsive to the address corresponding to the address of the powered element and the primary controller working improperly, use, by the redundant controller in the powered element, the redundant communication data to execute the set of instructions included in the redundant communication data;
  responsive to the execution of the set of instructions, send, by the redundant controller in the powered element, a reply message to the ACPDC controller; and
  responsive to the address failing to correspond to the address of the powered element, ignore, by the redundant controller in the powered element, the redundant communication data.

9. The computer program product of claim 8, wherein the computer readable program to send the reply message to the ACPDC controller further includes the computer readable program that causes the rack-mounted data processing system to:
  inject, by the redundant controller in the powered element, the reply message for the ACPDC controller onto the redundant alternating current power signal;
  receive, by the ACPDC controller, the redundant alternating current power signal with the reply message;
  extract, by the ACPDC controller, the reply message from the redundant alternating current power signal;
  determine, by the ACPDC controller, whether the reply message is from the powered element; and
  responsive to the reply message originating from the powered element, send, by the ACPDC controller, the reply message to the programming device external to the rack-mounted data processing system.

10. A rack-mounted data processing system, comprising:
  an alternating current power distribution and communication (ACPDC) controller and a powered element, wherein the powered element receives a primary alternating current power signal from the ACPDC controller with primary communication data and a redundant alternating current power signal from the ACPDC controller with redundant communication data;
  a first processor within the powered element;
  a first memory coupled to the first processor, wherein the first memory comprises first instructions which, when executed by the first processor, cause the first processor to:
    determine whether the primary communication data is intended for the powered element;
    responsive to the primary communication data being for the powered element and the primary controller working properly, executing a set of instructions included in the primary communication data; and
    responsive to execution of the set of instructions, send a reply message to the ACPDC controller, wherein the first instructions to send the reply message to the ACPDC controller further cause the first processor to:
    inject the reply message for the ACPDC controller onto the primary alternating current power signal, wherein the ACPDC controller comprises a third processor and a third memory coupled to the third processor, wherein the third memory comprises third instructions which, when executed by the third processor, cause the third processor to:
    receive the primary alternating current power signal with the reply message;
    extract the reply message from the primary alternating current power signal;
    determine whether the reply message is from the powered element; and
    responsive to the reply message originating from the powered element, send the reply message to a programming device external to the rack-mounted data processing system;
  a second processor within the powered element; and
  a second memory coupled to the second processor, wherein the second memory comprises second instructions which, when executed by the second processor, cause the second processor to:
    determine whether the redundant communication data is intended for the powered element;
    monitor the functions performed by the first processor in the powered element to determine whether the primary controller is working improperly; and
    responsive to the redundant communication data being for the powered element and the first processor working improperly, execute a set of instructions included in the redundant communication data.

11. The rack-mounted data processing system of claim 10, wherein the first instructions to determine whether the primary communication data is intended for the powered element further cause the first processor to:
  analyze the communication data for an address;
  determine whether the address corresponds to an address of the powered element;
  responsive to the address corresponding to the address of the powered element, use the primary communication data to execute the set of instructions included in the primary communication data; and
  responsive to the address failing to correspond to the address of the powered element, ignore the primary communication data.

12. The rack-mounted data processing system of claim 10, wherein the set of instructions include instructions to power cycle the powered element.

13. The rack-mounted data processing system of claim 10, wherein the powered element is a field replaceable unit and wherein the field replaceable unit is at least one of a computer, router, switch, modular storage element, controller, printer, or serial attached SCSI hard disk drive.

14. The rack-mounted data processing system of claim 10, wherein the first instructions further cause the first processor to:
  extract the primary communication data from the primary alternating current power signal.

15. The rack-mounted data processing system of claim 10, further comprising:
  the ACPDC controller;
  the third processor within the ACPDC controller; and the third memory coupled to the third processor, wherein the third memory comprises third instructions which, when executed by the third processor, cause the third processor to:
receive communication data from the programming device external to the rack-mounted data processing system via a primary communications connection intended for the powered element in a plurality of powered elements;
inject the primary communication data for the powered element onto the primary alternating current power signal, wherein the primary alternating current power signal supplies primary power to the plurality of powered elements; and
inject the redundant communication data for the powered element onto the redundant alternating current power signal, wherein the redundant alternating current power signal supplies redundant power to the plurality of powered elements.

16. The rack-mounted data processing system of claim 10, wherein the second instructions to determine whether the redundant communication data is intended for the powered element further cause the second processor to:
analyze the communication data for an address;
determine whether the address corresponds to an address of the powered element;
responsive to the address corresponding to the address of the powered element, use the redundant communication data to execute the set of instructions included in the redundant communication data;
responsive to the execution of the set of instructions, send a reply message to the ACPDC controller; and
responsive to the address failing to correspond to the address of the powered element, ignore the redundant communication data.

17. The rack-mounted data processing system of claim 16, wherein the second instructions to send the reply message to the ACPDC controller further cause the second processor to:
inject the reply message for the ACPDC controller onto the redundant alternating current power signal, wherein the ACPDC controller comprises the third processor and the third memory coupled to the third processor, wherein the third memory comprises third instructions which, when executed by the third processor, cause the third processor to:
receive the redundant alternating current power signal with the reply message;
extract the reply message from the redundant alternating current power signal;
determine whether the reply message is from the powered element; and
responsive to the reply message originating from the powered element, send the reply message to the programming device external to the rack-mounted data processing system.

18. A method, in a rack-mounted data processing system, to communicate to a powered element from an alternating current power distribution and communication (ACPDC) controller in the rack-mounted data processing system, the method comprising:
receiving, by the powered element, a primary alternating current power signal with primary communication data from the ACPDC controller and a redundant alternating current power signal with redundant communication data;
determining, by a primary controller in the powered element, whether the communication data is intended for the powered element;
determining, by a redundant controller in the powered element, whether the redundant communication data is intended for the powered element;
responsive to the primary communication data being for the powered element and the primary controller working properly, executing, by the primary controller in the powered element, a set of instructions included in the primary communication data;
responsive to execution of the set of instructions, send, by the primary controller in the powered element, a reply message to the ACPDC controller, wherein the computer readable program to send the reply message to the ACPDC controller further includes computer readable program that causes the rack-mounted data processing system to:
inject, by the primary controller in the powered element, the reply message for the ACPDC controller onto the primary alternating current power signal;
receive, by the ACPDC controller, the primary alternating current power signal with the reply message;
extract, by the ACPDC controller, the reply message from the primary alternating current power signal;
determine, by the ACPDC controller, whether the reply message is from the powered element; and
responsive to the reply message originating from the powered element, send, by the ACPDC controller, the reply message to a programming device external to the rack-mounted data processing system;
monitoring, by the redundant controller in the powered element, the functions performed by the primary controller in the powered element to determine whether the primary controller is working improperly; and
responsive to the redundant communication data being for the powered element and the primary controller working improperly, executing, by the redundant controller in the powered element, a set of instructions included in the redundant communication data in the powered element.

* * * * *